United States Patent
Zeller et al.

[11] Patent Number: 5,433,122
[45] Date of Patent: Jul. 18, 1995

[54] METHOD OF MEASURING THE LENGTH OF WINDING MATERIAL RUNNING ONTO A WINDING BEAM

[75] Inventors: Hans-Peter Zeller, Flawil; Hans-Peter Gemperli, St. Gallen, both of Switzerland

[73] Assignee: Benninger AG, Fabrikstrasse, Switzerland

[21] Appl. No.: 181,063

[22] Filed: Jan. 14, 1994

[30] Foreign Application Priority Data

Jan. 27, 1993 [CH] Switzerland .............. 229 93

[51] Int. Cl.$^6$ .............................. G01B 21/06
[52] U.S. Cl. .................... 73/865.8; 364/562
[58] Field of Search .............. 73/865.8; 364/562, 470

[56] References Cited

U.S. PATENT DOCUMENTS

| | | | |
|---|---|---|---|
| 3,145,294 | 8/1964 | Jackson | 364/562 |
| 4,052,599 | 10/1977 | Whiteley et al. | 364/562 X |
| 4,117,600 | 10/1978 | Guignard et al. | 364/562 X |
| 4,179,817 | 12/1979 | Lavigne et al. | 33/735 X |
| 4,356,557 | 10/1982 | Bell et al. | 364/562 |
| 4,447,955 | 5/1984 | Stutz et al. | 364/562 |
| 4,549,268 | 10/1985 | Stutz | 364/562 X |
| 4,635,216 | 1/1987 | Stutz et al. | 364/562 |
| 4,852,263 | 8/1989 | Kerr | 364/562 X |
| 4,924,596 | 5/1990 | Vachan | 33/715 |
| 5,060,395 | 10/1991 | Pepin | 33/735 |

FOREIGN PATENT DOCUMENTS

| | | | |
|---|---|---|---|
| 3111112 | 10/1982 | Germany | 364/562 |
| 3215322 | 10/1983 | Germany . | |
| 1019221 | 5/1983 | U.S.S.R. | 364/562 |

Primary Examiner—Thomas P. Noland
Attorney, Agent, or Firm—Shoemaker and Mattare Ltd.

[57] ABSTRACT

Method of measurement of the total length of a yarn formed winding material (3) running onto a wound package (1), in particular a yarn web running onto the winding beam of a winding machine. During continuous winding operation, the length is ascertained by means of a measuring roll (2) over which the material to be wound (3) is guided. During acceleration and braking procedures, slippage occurs between the material to be wound (3) and the measuring roll (2). On occurrence of slippage, the system of measurement is changed, and the length of the wound package is determined from the rotational speed of the wound package ($\omega_w$) and the circumference of the wound package (1). The circumference of the wound package (1), as well as the increase of the wound package circumference per rotation of the wound package, are ascertained during continuous winding operation.

19 Claims, 3 Drawing Sheets

METHOD OF MEASURING THE LENGTH OF WINDING MATERIAL RUNNING ONTO A WINDING BEAM

BACKGROUND OF THE INVENTION

The invention concerns a method for measuring the total length of winding material being wound onto a winding beam.

These types of methods are mainly known and in use with beaming and sectional warping machines of various types. The material to be wound mostly concerns yarns, guided in the form of a strip.

Here, it is important that the length of the material being wound is exactly measured. In practice, for determination of the length, the material being wound is guided over a measuring roll for determination of the total length. Slippage occurs between the material being wound and the measuring roll during braking and, acceleration procedures, the extent of which is not easy to establish. This results in length measuring errors: during running up to speed, a certain time is required until the measuring roll is accelerated at a synchronous speed with the material to be wound, and during braking the measuring roll will rotate further due to its rotational inertia. In the following description, the operating phases when slippage occurs on the measuring roll will be termed slippage operation, the phases without slippage will be termed continuous operation.

Dispensing totally with the measuring roll has already been recommended. Thereafter, the total length should be ascertained from the rotational speed of the wound package and the circumference of the wound package. This has, however, proved difficult since the smallest error when asertaining the thickness of the wound package will lead to a considerable discrepancy between the calculated length value and the actual length value.

Switching between two measuring methods during operation has therefore been recommended in DE-3215322. In continuous operation, the length of the wound package is measured by means of a measuring roll arrangement. In addition, a second measuring method is provided, where the wound length is calculated from the rotational speed of the wound package and the circumference of the wound package. The arrangement further incorporates a device which can detect the occurrence of slippage on the measuring roll. Such devices are, for example, described in DE-3215322, from Schlafhorst. This device is used for switching between the two measuring methods in such a way that during continuous winding operation, the measurement is executed by means of the measuring roll, and with the occurrence of slippage, immediate switching to the alternative measuring method is initiated. With that method, the length is deduced from the number of rotations or partial rotations multiplied by the respective circumference of the wound package. This measuring method is maintained until the continous winding operation is once again attained; the method then reverts to measurement by means of the measuring roll.

A difficulty with the known arrangement is to determine the circumference of the wound package during slippage operation as exactly as possible: the accuracy of the desired length measurement is dependent on this. Here, measurement of the wound package circumference during continuous operation has been recommended, in order then to have this available when slippage occurs. For that, the length of the winding material wound during one rotation of the wound package is measured on the measuring roll. This measurement is executed at each rotation of the wound package and the measurement value ascertained is stored in an intermediate memory. When slippage occurs, switch over to measurement by means of rotational speed and the circumferential length of the wound package will be initiated, the last circumferential length to have been measured being available in the mentioned intermediate memory. Now, after each rotation of the wound package, the total length is increased by the stored circumferential length. This is maintained until continuous winding operation reinstates itself. If slippage on the measuring roll prevails during several rotations, the additional problem will arise that the circumference of the wound package will not remain constant, but will increase with each rotation of the wound package. In order to correct this error, increasing the last ascertained circumference of the wound package by a constant correction value with each further rotation has thus been recommended. This correction value is to be ascertained by means of a table, on the basis of parameters such as, for example, yarn material and yarn spacing. The input of such correction values is, in practice, extremely time consuming. Apart from that, the correction values are inaccurate and lead to measurement errors mainly during more lengthy slippage operation.

SUMMARY OF THE INVENTION

The invention has the purpose of measuring the total length more accurately than up to the present time, and with that to attain increased automation of the operation.

In particular, this is achieved in that the increase of the circumference of the wound package is not derived from a table, but is ascertained and stored during continuous operation. Thus, errors arising because of the inaccuracy of the tables will be avoided, and the manual input of parameters of the material to be wound will no longer be necessary.

In the following description of the invention, abbreviations for the individual values are introduced and explained. These abbreviations will also be used when describing examples of the embodiments.

The length of the material running onto a round, wound package can be determined by multiplying the change in the rotational angle of the wound package by a value which corresponds to the circumferential length per rotational angle. This value is dependent on the chosen unit of angle. If, for example, the angle is given in whole rotations, the angle must be multiplied by the circumference of the wound package in order to obtain the length of the wound package; if, on the other hand, the angle is denoted as a radian (one rotation$=2\pi$), the length is thus the product of angle and radius of the wound package. Formulated generally, the multiplicand corresponds to the change of total length $\Delta l$, related to the change of rotational angle $\Delta \phi_w$ of the wound package. In the following; this is denoted as the relative circumference $Uw_{rel}$ of the wound package, the unit of angle used remaining open. In practice, it can also make sense to define an increment of a rotation measurer (e.g. 1/500 of a rotation) as a unit of angle. With the following descriptions, however, the designation of one unit of angle is assumed, so that all data, such as $\Delta\phi_w$, $Uw_{rel}$ etc relate to one and the same unit of angle. The same applies, analogously, to data concerning the rotational speed of the wound package $\omega_w$ and the rotational speed $\omega_m$ of the measuring roll.

The relative circumferential length of the wound package $Uw_{rel}$ becomes increasingly large with increasing thickness of the wound package; $Uw_{rel}$, assuming a constant yarn tension, increases by a constant value $\Delta Uw_{rel}$ per rotational angle $\Delta\phi_w$ of the wound package. This value $\Delta Uw_{rel}/\Delta\phi_w$ is denoted in the following as the relative change to the circumference of the wound package and is abbreviated to $dUw_{rel}/d\phi_w$. This value shall represent the nature of the physical quantity without, at the same time, concerning a "continuous" differentiation (Differential Quotient) in the strict mathematical sense.

Rotation measurers are connected to the axes of the measuring roll and the winding beam. Incremental senders can be concerned here. In continuous operation, the wound package length is now ascertained on the basis of the measuring roll, and simultaneously the relative circumference of the wound package $Uw_{rel}$ is ascertained, together with the relative change to the wound package circumference $dUw_{rel}/d\phi_w$.

The relative circumference of the wound package $Uw_{rel}$ can be determined according to the equation:

$$Uw_{rel} = \frac{Um_{rel}\omega_m}{\omega_w} \quad (1)$$

$Um_{rel}$ is, with that, the relative measuring roll circumference. The definition of $Um_{rel}$ is analogous to that of $Uw_{rel}$; since the circumference of the measuring roll is a constant, then $Um_{rel}$ is a constant. If angle measuring rotation senders are used, $Uw_{rel}$ can be determined, with advantage, by the equation:

$$Uw_{rel} = \frac{Um_{rel}\Delta\phi_m}{\Delta\phi_w} \quad (2)$$

In this case, the relationship of rotational angle $\Delta\phi_m$ of the measuring roll to the simultaneous rotational angle $\Delta\phi_w$ of the wound package is set.

$dUw_{rel}/d\phi_w$ is ascertained from the change of $Uw_{rel}$. There are numerous possibilities:

Firstly, the value $Uw_{rel}$ can be measured twice, in sequence. The increase of the relative wound package circumference $\Delta Uw_{rel}$ between these two measurements is then related to the rotational angle $\Delta\phi_w$, through which the wound package is rotated between both the measurements. The $Uw_{rel}$ measurements can here be made periodically, the rotational angle $\Delta\phi_w$ between the two measurements varying on the basis of the varying wound package rotational speed $\omega_w$. The difficulty of this measuring method lies in the exact ascertainment of the rotational angle $\Delta\phi$ of the wound package. This in particular leads to difficulties if the rotational speed $\omega_w$ of the wound package is very low and as a result of this the rotation of the wound package between two measurements is very slight. When the machine is at temporary rest, this method will no longer provide useful results.

An alternative to this is not to periodically carry out the individual measurements for determining $Uw_{rel}$, but to remeasure in each case after a certain, constant change in rotational angle $\Delta\phi_w$ of the wound package. The interval of the measurements is now dependent on the rotational speed of the wound package. With this method, operating reliability is clearly increased, the accuracy is no longer dependent on the accuracy of the $\Delta\phi_w$ measurement, and the measurements will be automatically suspended when the wound package is at rest.

It is also conceivable that in the case rotation measurers, these could be rotational speed measuring devices such as, for example, a tachometer generator. In this case, the relative change to the wound package circumference $dUw_{rel}/d\phi_w$ can be ascertained as follows:

$$\frac{dUw_{rel}}{d\phi_w} = \frac{dUw_{rel}}{dt} \cdot \frac{1}{\omega_w} \quad (3)$$

Differentiation according to time can be executed, here, either within an analagous differential element or through subtraction of two sequential measurements of rotational speed. This arrangement has the advantage that it can also be put to use when only a revolution counter is available and the rotational angle cannot be directly ascertained. The accuracy, however, is decisively dependent on the accuracy of the measurement of rotational speed, (which can lead to particular difficulties when the rotational speed is low) and the method will not deliver useable measuring results especially when the wound package is at rest.

The ascertained values of the relative circumference $Uw_{rel}$ of the wound package and the relative change to the wound package circumference are stored in an intermediate memory. The accuracy of the ascertained $Uw_{rel}$ and $dUw_{rel}/d\phi_w$ can be increased by means of suitable statistical evaluation of numerous measurements:

The relative change to the wound package circumference $dUw_{rel}/d\phi_w$ remains almost constant during the winding procedure, in so far as the winding tension remains constant. It is therefore possible to increase the accuracy of the measurements in that a mean value is obtained from numerous ascertained values of $dUw_{rel}/d\phi_w$. Good results and simple evaluation are attained by using the arithmetical mean value.

The relative wound package circumference $Uw_{rel}$ increases with increasing wound package size, proportional to the rotational angle $\phi_w$ of the wound package. Here too, with suitable mathematical means (linear extrapolation), on the basis of the known points of measurement and the momentary $\phi_w$, the most likely momentary value of $Uw_{rel}$ can be deduced. This 'most likely' value of $Uw_{rel}$ will be denoted as the expected value of $Uw_{rel}$.

In order to be able to clearly differentiate between the individual terms, an index will be introduced at this point.

The index O denotes values at the commencement of slippage operation:

$Uw_{rel-O}$ relative wound package circumference $Uw_{rel}$ at commencement of slippage operation, $l_O$ Total length of the wound material up to commencement of slippage operation, The index s denotes values during (i.e since commencement) of slippage operation:

$l_s$ Length of the material wound up since commencement of slippage operation, $\phi_{ws}$ Angle of rotation of the wound package since commencement of slippage operation.

When slippage occurs, measurement of the total length is continued, using the alternative method on the basis of the signals of the wound package rotation measurer and the values $Uw_{rel-0}$ and $dUw_{rel}/d\phi_w$, which are available in the intermediate memory.

Dependent on the measurement arrangement in use, there are varying methods of advantageously realising these measurements. In all cases, the total length $l$ during slippage operation is determined in that $l_s$ is implicitly or explicitly ascertained and added to $l_0$. Any form, where the value of $l_s$ is actually present and able to be added to $l_0$, is to be understood as the explicit ascertainment of $l_s$. It is often also possible to establish the increase in $l_s$ by a $\Delta l_s$, and to add these individual $\Delta l_s$ sequentially to $l_0$; here, the value of $l_s$ is not explicitly present, and we are talking of an implicit asertainment of $l_s$.

A first version is based on the ascertainment of the value $Uw_{rel}$ during slippage operation. The increase of $Uw_{rel}$ since commencement of slippage operation is determined in that the rotational angle $\phi_{ws}$ of the wound package is measured since $$Uw_{rel} = Uw_{rel-0} + \phi_{ws}\frac{dUw_{rel}}{d\phi_w} \quad (4)$$

commencement of slippage operation and multiplied by $dUw_{rel}/d\phi_w$.

$UW_{rel}$ is determined through addition of this increase and $Uw_{rel-0}$. The increase $l_s$ of the wound package length during slippage operation can now be determined by the equation:

$$l_s(t) = \int_0^t Uw_{rel}\omega_w d\tau \quad (5)$$

For this, integration over time is necessary. The integration is mostly discretely carried out in a computer. For this method, advantageously only a pure measurement of rotational speed is necessary, but difficulties can arise with the exact measurement of lower rotational speeds.

Analogous to what has already been stated, also in this case there is the possiblity of dispensing with the integral over time and deducing the rotational angle of the wound package directly:

$$l_s(t) = \int_0^{\phi_{ws}(t)} Uw_{rel} d\phi_{ws} \quad (6)$$

This calculation is made in the most simple way if in each case, after a constant $\Delta\phi_w$, the new $Uw_{rel}$ is determined, and the newly arrived at $\Delta l_s$ is determined according to the equation $\Delta l_s = w_{rel}\Delta\phi_w$. $l_s$ will then be the sum of all $\Delta l_s$. In order to avoid errors, the newly ascertained $Uw_{rel}$ should not be used, but rather the mean value of the new and of most recently ascertained $Uw_{rel}$:

with $\phi_{ws} = n\Delta\phi_w$ (n=the number of measurements since commencement of slippage operation), the $Uw_{rel}(n)$ to be used when calculating $\Delta l_s(n)$ is:

$$Uw_{rel}(n) = Uw_{rel-0} + \frac{2n-1}{2}\Delta\phi_w \frac{dUw_{rel}}{d\phi_w} \quad (7)$$

As already stated, $l_s$ then calculates as:

$$l_s = \sum_{k=1}^n \left( Uw_{rel-0}\Delta\phi_w + \frac{2k-1}{2}\Delta\phi_w^2 \frac{dUw_{rel}}{d\phi_w} \right) \quad (8)$$

This sum can be directly calculated with the aid of the function $$\sum_{k=1}^n \frac{2k-1}{2} = \frac{n^2}{2} \quad (9)$$

and will result in $$l_s = n\Delta\phi_w Uw_{rel-0} + \frac{(n\Delta\phi_w)^2}{2}\frac{dUw_{rel}}{d\phi_w} \quad (10)$$

This result demonstrates a further possibility for calculating the value of $l_s$ without adding of the individual $\Delta l_s$. In addition, the equation 10 can be evaluated directly at any given instant. Equation 10 can be particularly simply evaluated if $\Delta\phi_w = 1$ is selected. This can be achieved through selection of a suitable unit of rotational angle. $\phi_{ws}$ must be known in order to evaluate the equation 10, as is also the case for other methods already mentioned.

$\phi_{ws}$ can be most easily ascertained with the use of rotation measurers which permit direct measurement of an angle. The new angle value is then either periodically, or always after a constant angle of rotation $\Delta\phi_w$, placed in a register or memory and can be called up from there. If the direct measurement of angle is not possible, then $\phi_{ws}$ can be determined by integration of $\omega_w$ over time.

Which method is used for determination of $l_s$ will mainly be dependent on whether a direct measurement of $\phi_w$ is possible and on the performance capability of the computer used for the evaluation. If computer time is to be saved, there is the possibility of dispensing with multiplication during the actual measuring procedure. The total length value is here raised in each case after a constant $\Delta\phi_w$ by a length increase value $\Delta l$ and this length increase value is, after each $\Delta\phi_w$, raised by a constant correction value. This correction value, as well as the length increase value $\Delta l(0)$ at commencement of slippage operation, is determined once on occurence of slippage operation:

$$\text{CorrectionValue} = \Delta\phi_w^2 \frac{dUw_{rel}}{d\phi_w} \quad (11)$$

$$\Delta l(0) = Uw_{rel-0}\Delta\phi_w - \frac{\text{CorrectionValue}}{2} \quad (12)$$

Here too, particularly simple evaluation will result if $\Delta\phi_w = 1$ is selected.

BRIEF DESCRIPTION OF THE DRAWINGS

The invention is more closely explained on the basis of the embodiment examples. Namely.

DESCRIPTION OF THE PREFERRED EMBODIMENT

Figure 1A:
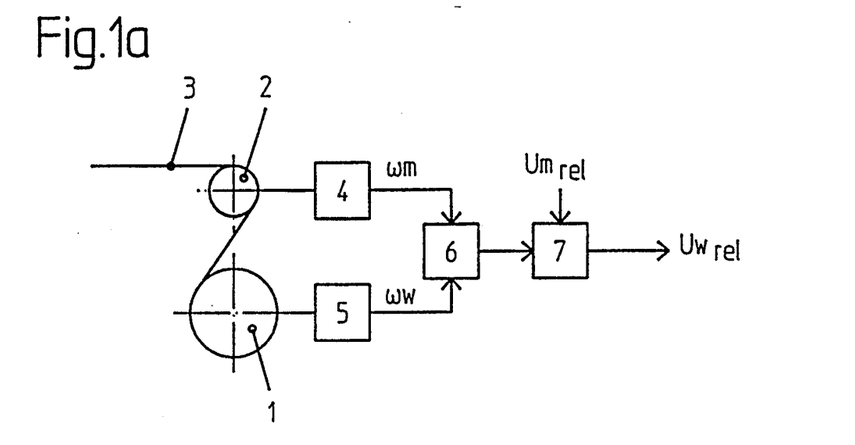
FIG. 1a,b a block diagram of arrangements for ascertaining the relative wound package circumference $Uw_{rel}$, FIG. 2a,b a block diagram of arrangements for ascertaining the relative change to the wound package circumference $dUw_{rel}/d\phi_w$, FIG. 3 a diagram to represent a method of ascertaining the expected value of the momentary relative wound package circumference $Uw_{rel}$ on the basis of a plurality measured values of $UW_{rel}$, FIG. 4 a diagram from which the ascertainment of the slippage wound package length $l_s$ can be seen, FIG. 5 a block diagram of an arrangement for ascertaining $l_s$ through using the rotational speed $\omega_w$ of the wound package, FIG. 6a,b,c block diagrams of arrangements for ascertaining $l_s$ with the use of constant rotational angle increments $\Delta\phi_w$ of the wound package.

A block diagram is schematically shown in FIG. 1a for ascertainment of the relative wound package circumference $Uw_{rel}$. The material being wound 3 runs over the measuring roll 2 and is wound onto the wound package 1. The measuring roll 2 and the wound package 1 are both coupled to a rotation measurer 4,5 measuring the rotational speed. These can be tachometer generators, for example. In order to determine the relative winding circumference $Uw_{rel}$, the fact is now exploited that—assuming slippage free running of the measuring roll—the relationship between the rotational speeds $\omega_m$ and $\omega_w$ corresponds to the relationship of the circumferential lengths of wound package and measuring roll. The rotational speed value $\omega_m$ of the measuring roll 2 is divided in a dividing arrangement 6 by the rotational speed $\omega_w$ of the wound package 1 and the result of this division is multiplied in the multiplying arrangement 7 by the relative measuring roll circumference $Um_{rel}$; the result is the momentary relative wound package circumference $Uw_{rel}$. This method has the advantage that rotation measurers measuring the rotational speed, such as tachometer generators, can be used; a direct measurement of rotational angle is unnecessary. With this method, the measurement of rotational speed can be problematic with very slowly turning wound packages; in particular when the wound package is at rest, no valid results will be delivered.

Figure 1B:
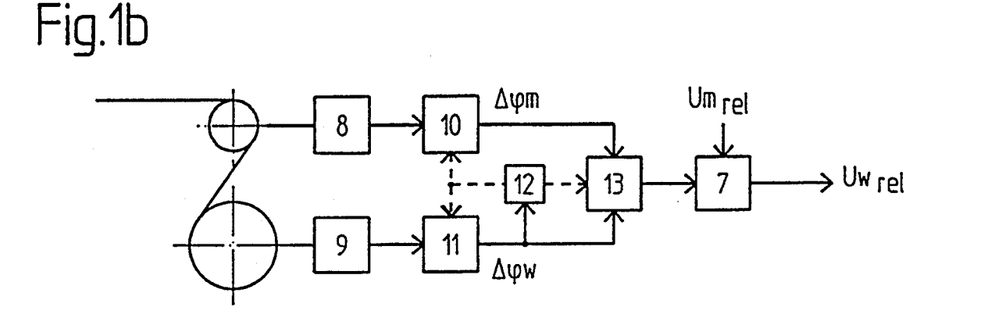

FIG. 1b shows the alternative to this method. Here, wound package 1 and measuring roll 2 are connected to rotational angle measuring rotational senders 8,9. Here incremental senders can be employed, for example. The procedure during determination of $Uw_{rel}$ is similar to that stated for FIG. 1a, only the rotational speeds are not divided by each other, but the rotational angle $\Delta\phi_m$ of the wound package is divided by the simultaneous rotational angle $\Delta\phi_w$ of the wound package. For this, the rotational angle of the measuring roll and the wound package are measured during a period of time. The duration of this period could in principle be freely chosen, but it is sensible to newly determine the momentary $Uw_{rel}$ in each case after a certain rotation $\Delta\phi_w$ of the wound package. Here, there will be no problem in measuring during slow rotation of the wound package, and in particular the measurements will be discontinued automatically when the wound package is at rest. The increment senders 8,9 shown in FIG. 1b are each connected with a counter 10, 11 which adds together the individual wound package angle increments. At the start, both counters 10, 11 are set to zero. The control unit 12 continuously monitors the rotation of the wound package. As soon as the wound package has rotated through $\Delta\phi_w$, the control unit 12 will initiate calculation of the relative wound package circumference $Uw_{rel}$ on the dividing arrangement 13, and will then return the counters 10,11 to zero.

Figure 2A:
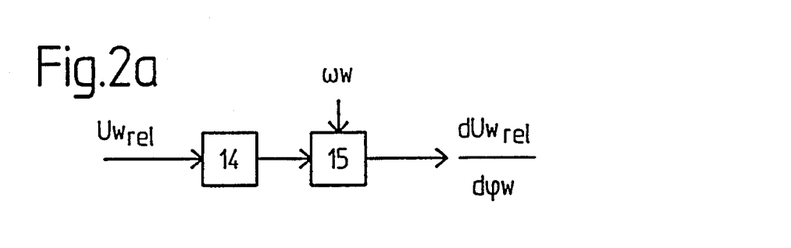
Figure 2B:
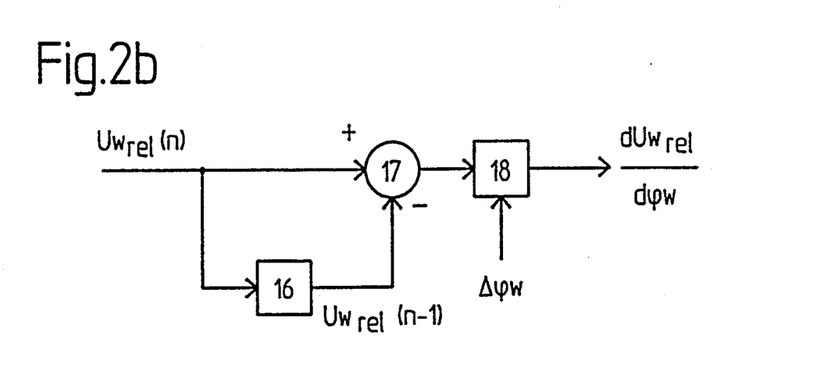

On the basis of FIGS. 2a and 2b, methods for ascertaining of $dUw_{rel}/d\phi_w$ from the measured $Uw_{rel}$ are explained. In the case of the variant according to FIG. 2a, $Uw_{rel}$ is differentiated according to time in a differential element 14 and the result is subsequently divided by the rotational speed $\omega_w$ of the wound package in a dividing device 15. This method is then used with advantage if the input value $Uw_{rel}$ is ascertained either continuously or periodically (thus by means of a method as shown in FIG. 1a), which will facilitate the calculation of a differentiation according to time.

FIG. 2b shows a method for determining of $dUw_{rel}/d\phi_w$ based upon the fact that the change of $Uw_{rel}$ between two measurements is related to the change $\Delta\phi_w$ of the wound package rotational angle between both the measurements. The $Uw_{rel}$ value of the last measurement to have been carried out is stored in an intermediate memory 16. After rotation of the wound package through a $\Delta\phi_w$, $Uw_{rel}$ is measured once again. The difference between the just measured $Uw_{rel}$ and the $Uw_{rel}$ stored in the intermediate memory is now calculated by a subtracting device 17, and the new $Uw_{rel}$ is then stored in the intermediate memory. The difference is divided by $\Delta\phi_w$ in a dividing device 18 and $dUw_{rel}/d\phi_w$ will result. This method can be used particularly easily if $Uw_{rel}$, as carried out in the case of FIG. 1b, is newly determined in each case after a constant rotational angle $\Delta\phi_w$.

Figure 3:
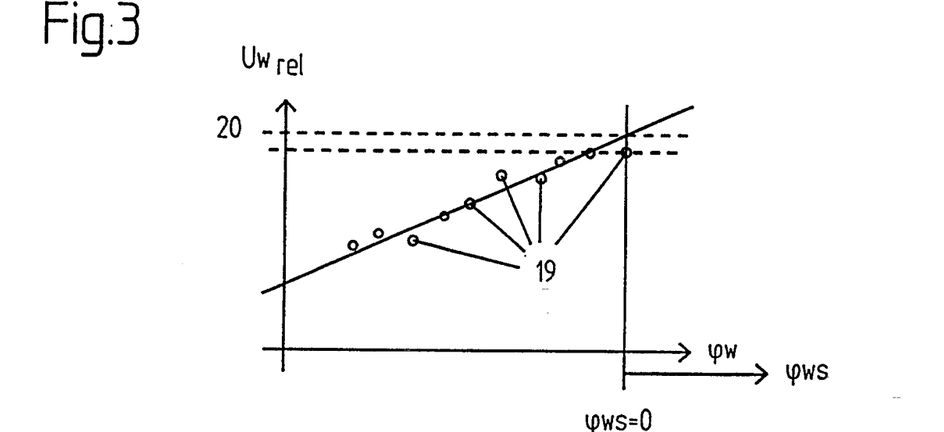

On the basis of FIG. 3, a method is explained for determination of the expected value 20 for the momentary $Uw_{rel}$. The relative wound package circumference $Uw_{rel}$ increases linearly with the rotational angle $\phi_w$ of the wound package. The value of $Uw_{rel}$ is measured over and over again during rotation of the wound package; the individual measurements are drawn in FIG. 3 as circles. The objective is to know the actual relative wound package circumference $Uw_{rel}$ as accurately as possible at commencement of slippage. If simply the last value to be measured for $Uw_{rel}$ is used, then a certain error is to be expected, since a small measurement error cannot be avoided. It is better not to use the last value to have been measured, but to calculate the size of the expected value for the momentary $Uw_{rel}$ from the greatest possible number of $Uw_{rel}$ measured values 19. The number of measured values used for determining the expected value of $Uw_{rel}$ is mainly dependent on the amount of computer time available for the task. Mathematical methods for execution of such a calculation are in general known, and discussion in any greater detail is not necessary here.

Since the final measurements made before detecting slippage operation are, with all probability, already misrepresented due to slippage on the measuring roll, it is further sensible not to use the last measurement results for statistical determination of $dUw_{rel}/d\phi_w$ and $Uw_{rel}$.

Figure 4:
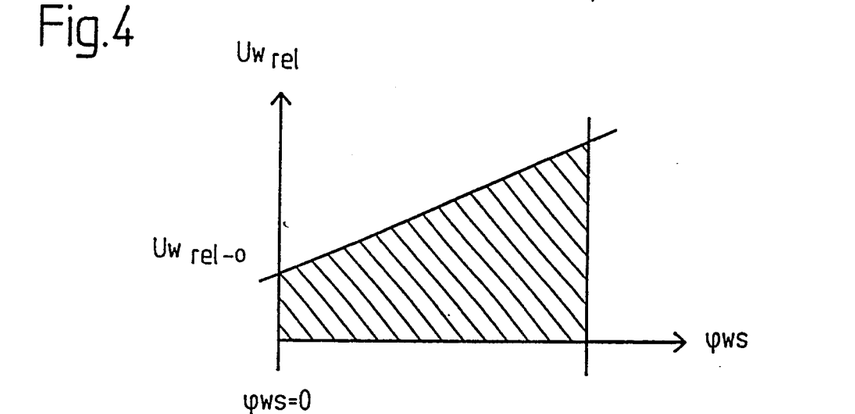

In FIG. 4, the increase of $Uw_{rel}$ is represented as a function of the rotational angle $\phi_{ws}$ of the wound package during slippage operation. At commencement of slippage operation, $Uw_{rel}$ has the value $Uw_{rel-0}$. The total length l is calculated, in that the slippage wound package length $l_s$, is ascertained explicitly or implicitly and is added to an already measured pre-slippage wound package length $l_0$. The slippage wound package length $l_s$ at a definite point in time t corresponds with the shaded area in FIG. 4. If the value $l_s$ is determined and added to $l_0$, $l_s$ will be thus explicitly ascertained; if, on the other hand, with an increase in $l_s$ of $\Delta l_s$, the individually ascertained $\Delta l_s$ are added to $l_O$, $l_s$ will thus be implicitly ascertained ($l_O$ is increased by $l_s$, the value of $l_s$ is however not explicitly available). The following figures show various possibilities for determining the slippage wound package length $l_s$.

Figure 5:
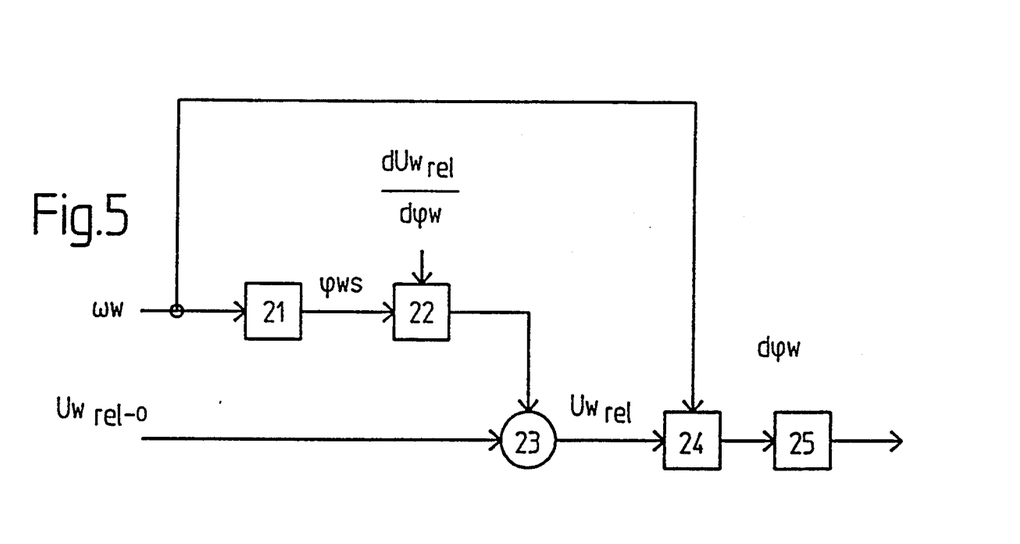

FIG. 5 shows a possible arrangement for ascertainment of $l_s$. In an initial step, the relative wound package circumference $Uw_{rel}$ is ascertained from $\omega_w$ and $Uw_{rel-O}$. In addition, $\omega_w$ is integrated over time by the integrating device 21 from commencement of slippage operation, and the result is multiplied by $dUw_{rel}/d\phi_w$ in the multiplying device 22. From this, the value for the increase of the relative wound package circumference since commencement of slippage operation will result. To this, the relative wound package circumference $Uw_{rel-O}$ at the commencement of slippage operation is added in the adding device 23, and $Uw_{rel}$ is available at the output of the adding device 23. For determining $l_s$, $Uw_{rel}$ is multiplied by $\omega_w$ in the multiplying device 24, and the product is integrated over time by the integrating device 25. This method permits continuous ascertainment of $l_s$ with the use of a pure rotational speed measuring rotation measurer, which suggests a combination of the methods introduced in FIG. 1a and 2a for determining $Uw_{rel}$ and $dUw_{rel}/d\phi_w$. It is, however, also possible to repeat the measurements periodically. For determining the total length, the thereby explicitly determined $l_s$ is added to $l_O$. It would also be possible, at commencement of slippage operation, to initiate the integrating device 25 at the commencement of slippage operation with the start value $l_O$, the total length then being available directly on the output of the integrating device 25, which would correspond to an implicit determination of $l_s$.

Figure 6A:
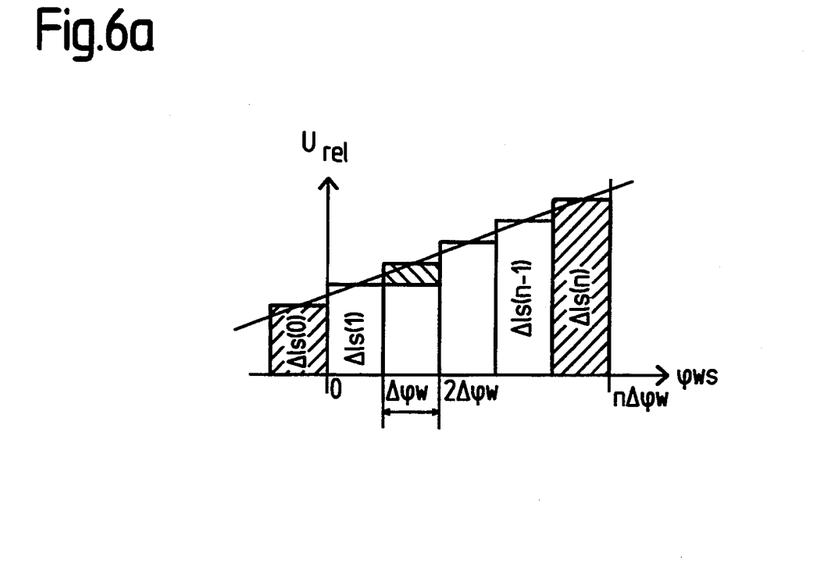

The methods explained on the basis of FIGS. 6a, b and c are based on the fact that the determining of $l_s$ is in each case repeated after a constant change to the rotational angle $\Delta\phi_w$ of the wound package. The graph shown in FIG. 6a corresponds to that in FIG. 4. Once again it concerns the determining of the shaded area shown in FIG. 4 (which corresponds to $l_s$). The rotational angle $\phi_{ws}$ of the wound package since commencement of slippage operation can, with the number n of the already accomplished measurements, be specified as $\phi_{ws}=n\Delta\phi_w$. With each further rotation of the wound package of $\Delta\phi_w$, $l_s$ will increase by $\Delta l_s(n)$. For determining $l_s(n)$, all $\Delta l_s$ must thus be added together:

$$l_s = \sum_{i=1}^{n} \Delta l_s(i) \qquad (13)$$

Figure 6B:
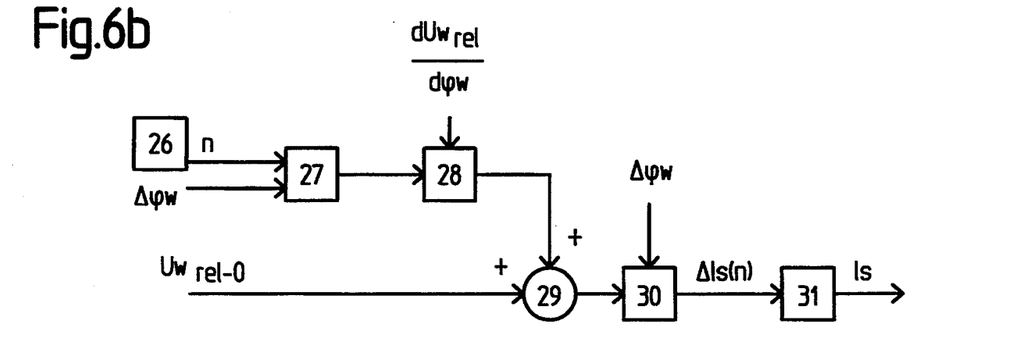

FIG. 6b shows a possibility for determination and addition of $\Delta l_s$. The memory 31 serves to add the $\Delta l_s$, and is reset to zero at the commencement of slippage operation. The counter 26 is raised by one after each rotational angle $\Delta\phi_w$ of the wound package and thus will always show the number n of the $\Delta\phi_w$ passed since commencement of slippage operation. In a first step, the "height" of the new $\Delta l_s$ field (see FIG. 6a) is determined, corresponding to the value of $Uw_{rel}$ when $\phi_{ws}=(n-\frac{1}{2})\Delta\phi_w$. In addition, $\phi_{ws}$ is first of all determined in the calculating unit 27 on the basis of the values n and $\Delta\phi_w$, and subsequently multiplied in the multiplying device 28 by $dUw_{rel}/d\phi_w$. The value of $Uw_{rel-O}$ is added to this result in the adding device 29, the result being the sought value of $Uw_{rel}$ (the height of the $\Delta l_s$ field). $Uw_{rel}$ is multiplied by $\Delta\phi_w$ in the multiplying device 30, the newly arrived at value $\Delta l_s$ being the result. This new $\Delta l_s$ is now added to the slippage wound package length $l_s$ stored in the memory 31.

Figure 6C:
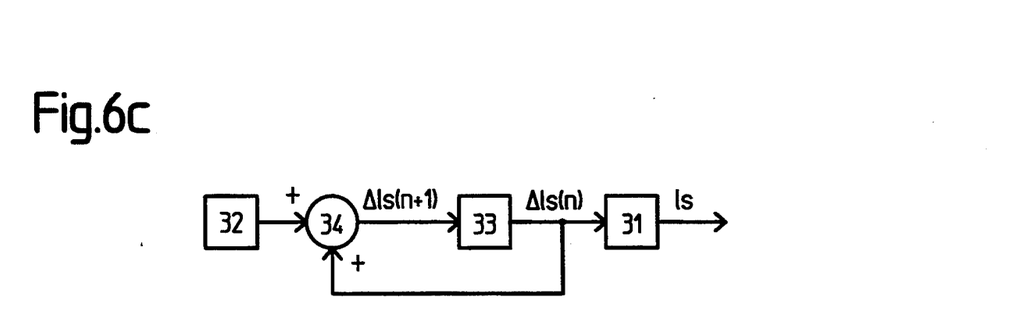

FIG. 6c shows a device for execution of a further simplified determination of $\Delta l_s$. As can be seen from FIG. 6a, the length increase value $\Delta l_s$ increases each time by a constant correction value 32. The length increase $\Delta_s(n)$ (compare with FIG. 6a) can therefore be determined in that the length increase $\Delta l_s(n-1)$ of the preceding $\Delta\phi_w$ is raised by the constant correction value 32. The value of the last $\Delta l_s$ to have been ascertained is stored in the intermediate memory 33. After the wound package has turned through a further $\Delta\phi_w$, the $\Delta l_s$ stored in the intermediate memory 33 is increased by the correction value 32 in the adding device 34, and the sum is once again stored in the intermediate memory 33. This new $\Delta l_s$ is now added to the slippage wound package length $l_s$ stored in the memory 31. When slippage operation arises, the correction value 32 and the intermediate memory 33 will be initialised with their start values. The correction value 34 is determined according to the equation:

$$\text{CorrectionValue} = \Delta\phi_w^2 \frac{dUw_{rel}}{d\phi_w}$$

and stored in the memory 16. The length increase value $\Delta l_s(O)$ (see FIG. 6a) is determined according to the equation:

$$\Delta l_0 = Uw_{rel-O}\Delta\phi_w - \frac{\text{CorrectionValue}}{2}$$

and stored in the intermediate memory 33.

Inasmuch as the invention is subject to modifications and variations, the foregoing description and accompanying drawings should not be regarded as limiting the invention, which is defined by the following claims and various combinations thereof:

We claim a:

1. A method of measuring the total length of a yarn type material as it is wound onto a wound package, comprising steps of contacting the material with a measuring roll which runs synchronously with the material, the measuring roll and the wound package each being connected to a respective rotational displacement measurer for ascertaining the rotational displacement, and during continuous winding operation, directly measuring the total length of material running onto the wound package, by sensing measuring roll rotation, and determining the relative circumference ($Uw_{rel}$) of the wound package on the basis of the measuring roll's size and storing the relative circumference, while monitoring the measuring roll for slippage, and when slippage is detected between the material being wound and the measuring roll, indirectly measuring the total length of material running onto the wound package by increasing the measured value for the total length by the relative circumferential length of the wound package with each rotational step of one unit of angle of the wound package, the last value to have been determined in continuous operation for the relative wound package circumference ($Uw_{rel}$) being increased with each rotational step of one unit of angle of the wound package by the relative change in wound package circumference ($dUw_{rel}/d\phi_w$), wherein the relative wound package circumference ($Uw_{rel}$) and the relative change in wound package circumference ($dUw_{rel}/d\phi_w$) with rotation of the wound package during continuous operation are ascertained and stored, and these stored values are used during slippage operation in order to determine the actual length ($l_s$) of the material wound during slippage operation.

2. Method according to claim 1, wherein the relative wound package circumference ($Uw_{rel}$) is determined according to one of the equations:

$$Uw_{rel} = \frac{Um_{rel}\omega_m}{\omega_w} \qquad Uw_{rel} = \frac{Um_{rel}\Delta\phi_m}{\Delta\phi_w}$$

Where:
$\omega_w$ Rotational speed of the wound package
$\omega_m$ Rotational speed of the measuring roll
$\Delta\phi_w$ Change to rotational angle of the wound package
$\Delta\phi_m$ Change to rotational angle of the measuring roll
$Um_{rel}$ Relative measuring roll circumference.

3. Device for ascertaining the relative circumference ($Uw_{rel}$) of a wound package (1) in a method according to claim 2, wherein the material to be wound (3), guided in the form of a strip, runs over the measuring roll (2) and is then wound onto the wound package (1), that the measuring roll (2) is connected to coordinate with a tachometer generator (4) and that the wound package is connected to coordinate with a tachometer generator (5), that the outputs of the tachometer generators (4,5) are connected to a dividing device (6) which divides the rotational speed of the measuring roll by the rotational speed of the wound package and that the output signal of the dividing device (6) is multiplied in a multiplying device (7) by the relative measuring roll circumference ($Um_{rel}$).

4. Method according to claims 1 or 2, wherein the change to the relative wound package circumference ($dUw_{rel}/d\phi_w$) is ascertained on the basis of the relative circumference ($Um_{rel}$) of the measuring roll (2) as well as from the signals from the rotation value measurer (4,8) of the measuring roll and from the rotational value measurer (5,9) of the wound package (1).

5. Method according to claims 1 or 2, wherein the relative change to the wound package circumference ($dUw_{rel}/d\phi_w$) is determined in that the ascertained relative wound package circumference ($Uw_{rel}$) is differentiated according to time and that the result of the differentiation is divided by the rotational speed ($\omega_w$) of the wound package (1).

6. Method according to claim 5, wherein the ascertainment of the relative wound package circumference ($Uw_{rel}$) and the relative change to the wound package circumference ($dUw_{rel}/d\phi_w$) is carried out during continuous operation at periodic intervals of time or in each case after a constant change to the wound package rotational angle ($\Delta\phi_w$).

7. Method according to claims 1 or 2, wherein the relative change to the wound package circumference ($dUw_{rel}/d\phi_w$) is determined in that the difference of two sequentially measured values of the relative wound package circumference ($Um_{rel}$) is compounded and this difference is divided by the rotational angle ($\Delta\phi_w$) of the wound package (1) occurring between the two measurements.

8. Method according to claim 7, wherein the ascertainment of the relative wound package circumference ($Uw_{rel}$) and the relative change to the wound package circumference ($dUw_{rel}/d\phi_w$) is carried out during continuous operation at periodic intervals of time or in each case after a constant change to the wound package rotational angle ($\Delta\phi_w$).

9. Method according to claim 1 or 2 the total length (l) during slippage operation is newly determined in each case after a constant rotational angle ($\Delta\phi_w$) of the wound package, in that the value for the total length (l) is increased by a length increase value ($\Delta l$) and this length increase value ($\Delta l$) is each time increased by a constant correction value (32).

10. Method according to claim 9, wherein the start value of the length increase ($\Delta l(O)$) and the constant correction value (32) at commencement of slippage operation is ascertained from the values of the relative wound package circumference ($Uw_{rel}$), the relative change to the wound package circumference ($dUw_{rel}/d\phi_w$) as well as the value of the constant rotational angle ($\Delta\phi_w$) between two wound package length determining measurements.

11. Method according to claim 1, wherein the accuracy of the measured relative change to the wound package circumference ($dUw_{rel}/d\phi_w$) is increased through compounding of a mean value from a plurality of measured values.

12. Method according to claims 1, wherein the accuracy of the measured relative wound package circumference ($Uw_{rel}$) is increased in that the expected value for the momentary relative wound package circumference, ($Uw_{rel}$) is determined from a plurality of measured values.

13. Method according to claims 1, wherein, during slippage operation, the rotational angle ($\phi_{ws}$) of the wound package since commencement of slippage operation is measured and the total length is ascertained in that the slippage wound package length ($l_s$) is ascertained with the use of the relative wound package circumference ($Uw_{rel}$) and the relative change to the wound package circumference ($dUw_{rel}/d\phi_w$) and is added to the total length ($l_O$) at commencement of slippage operation.

14. Method according to claim 13, wherein the rotation angle ($\phi_{ws}$) of the wound package is ascertained since commencement of slippage operation in that the rotational speed ($\dot\phi_w$) of the wound package is integrated over time.

15. Method according to claim 13, wherein the rotational angle ($\phi_{ws}$) of the wound package since commencement of slippage operation is measured by summation of measured partial rotational angles ($\Delta\phi_w$).

16. Method according to one of the claims 13, 14 or 15, wherein the slippage wound package length ($l_s$) is determined in that either the product of the relative wound package circumference ($Uw_{rel}$) and the wound package rotational speed ($\omega_w$) is integrated over time, or the relative wound package circumference ($Uw_{rel}$) is integrated over the wound package rotational angle ($\phi_{ws}$), the relative wound package circumference ($Uw_{rel}$) being determined by the equation:

$$Uw_{rel} = \phi_{ws}\frac{dUw_{rel}}{d\phi_w} + Uw_{rel-0}$$

Where:

$\phi_{ws}$ Rotational angle of the wound package during slippage operation $dUw_{rel}/d\phi_w$ Relative change to the wound package circumference $Uw_{rel-O}$ Relative wound package circumference at commencement of slippage operation.

17. Method according to claim 13, 14 or 15 wherein the slippage wound package length ($l_s$) is determined according to the equation:

$$l_s(t) = U_{rel}\phi_{ws}(t) + \frac{dU_{rel}}{d\phi_w}\frac{\phi_{ws}^2(t)}{2}$$

Where:

$\phi_{ws}(t)$ Rotational angle of the wound package during slippage operation $dUw_{rel}/d\phi_w$ relative change to the wound package circumference $Uw_{rel-O}$ Relative wound package circumference at commencement of slippage operation.

18. Method according to claim 17, wherein the total length (l) is calculated once only, at the end of slippage operation.

19. Method according to claim 13, 14 or 15, wherein calculation of the wound package length during slippage operation is carried out at periodic intervals of time.

* * * * *